Patented Sept. 23, 1952

2,611,775

UNITED STATES PATENT OFFICE 2,611,775

PRODUCTION OF ARYLHALOSILANES

Arthur J. Barry, Midland, Mich., assignor to Dow Corning Corporation, Midland, Mich., a corporation of Michigan No Drawing. Application April 10, 1950, Serial No. 155,125. In Great Britain December 4, 1947

11 Claims. (Cl. 260—448.2)

This invention relates to the manufacture of aromatic halosilanes. It is particularly concerned with an improved process for the manufacture of an organohalosilane in which one valence of the silicon atom is satisfied by direct linkage to a carbon atom in a benzenoid hydrocarbon.

The present application is in part a continuation of my copending applications Serial Nos. 55,021 and 55,023, filed October 16, 1948, now Patent No. 2,572,302. In said copending applications it is shown that a benzenoid hydrocarbon may be reacted, in the presence of $BCl_3$ or $BF_3$, with trichlorosilane or with an organodichloromonohydrosilane to produce either aryltrichlorosilane or arylorganodichlorosilane respectively.

The use of the boron halide catalysts in this reaction resulted in improved yields at lower temperatures. However, both $BCl_3$ and $BF_3$ are expensive compounds. They are difficult to handle because of their volatile, toxic natures. They are extremely unstable toward water, even atmospheric moisture causing their immediate hydrolysis. They may be recovered from the products of reactions in which they have been used as catalysts, but their low boiling points make such recovery an expensive operation.

Objects of the present invention are to provide an improved process for effecting interaction of benzenoid hydrocarbons and polyhalomonohydrosilanes; for the provision of improved catalysts for said interaction; and for the production of aromatic halosilanes in high yield with accompanying low yields of by-products.

Other objects and advantages will be apparent from the following description.

It has been found that a benzenoid hydrocarbon, free of aliphatic unsaturation in any side chains, may be reacted with a polyhalomonohydrosilane in the presence of a silicon-borate complex, at a reaction temperature above 150° C. and under sufficient pressure that at least a portion of the reaction mixture is in a condensed phase, to produce arylhalosilanes.

Benzenoid hydrocarbons with which this invention is concerned include benzene, polyphenyls such as biphenyl and napthalene, and alkyl substituted benzenes such as toluene, xylene, cumene, and mesitylene. Inasmuch as cracking of side chains is obtained to some extent with such materials as cumene and relatively pure products are obtained when the side chains contain but one carbon atom each, it is preferred to employ benzene, a polyphenyl, or the methyl derivatives of benzene as the hydrocarbon.

The polyhalomonohydrosilanes which are suitable for use in this process are compounds having the general formula $R_nHSiCl_{3-n}$, in which R represents a monovalent hydrocarbon radical free of aliphatic unsaturation and $n$ is an integer of from 0 to 1. The preferred polyhalomonohydrosilanes are $HSiCl_3$, $CH_3HSiCl_2$, and $C_6H_5HSiCl_2$.

The silicon-borate complex which is employed is one in which at least some, but only a portion, of the valences of the silicon and boron are satisfied by substituents of the group consisting of phenyl, methyl, alkoxy, chlorine, and hydrogen, and the remaining valences of the silicon and boron are satisfied by oxygen atoms, the valences of which are linked to the silicon and boron atoms of the complex.

The silicon-borate complexes are employed in a proportion such that at least 0.01 per cent and generally less than 0.5 per cent of boron is present, based on the total weight of the reactants, though larger proportions may be employed if desired.

The complexes employed may be either relatively simple identifiable materials or of such complexity that identification of molecular species is impossible. The compound $[(CH_3)_3SiO]_3B$ exemplifies the identifiable type of complex. The more complex types may take such forms as

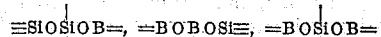

and the like. In these formulae the open bonds may be satisfied by substituents of the above-stated group or be linked to other silicon or boron atoms through oxygen. Under the reaction conditions of the benzenoid hydrocarbon with the polyhalomonohydrosilane, it appears that the phenyl, methyl, alkoxy, chlorine, or hydrogen substituents on the silicon-borate complex may migrate between the silicon and boron atoms. Thus, even when the starting composition of the complex is known, it is impossible to ascertain the position of the aforesaid substituents under actual operating conditions.

The complexes employed may be formed either in situ in the reaction mixture or may be prepared in advance and added to the reaction mixture.

The complexes may be formed by the interaction of a silane and a compound of boron. The silanes which are suitable for the formation of the present complex are of the general formula $R'_{4-a-b}H_aSiX_b$, where each $R'$ represents a monovalent hydrocarbon radical, each $X$ is selected from the group consisting of alkoxy and chlorine, $a$ is an integer of from 0 to 1, $b$ is an integer of from 1 to 4, and the sum of $a$ and $b$ is not greater than 4. Examples of suitable silanes are

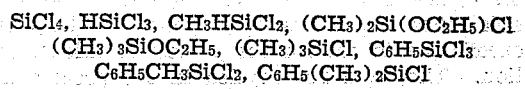

and the like. If an alkoxy substituted silane is used, it is preferable that the alkoxy group contain less than 5 carbon atoms. The boron employed for the preparation of the complexes may be in the form of boric acid, boric anhydride, or organic borates such as tributylborate, phenylboric acid: $C_6H_5B(OH)_2$, and diphenylboric acid: $(C_6H_5)_2BOH$. Likewise the complexes hereof may be formed by the interaction of siloxanes or silanols with boron halides or organoboron-halides such as phenylboron dichloride and diphenylboron chloride. When silicon halides are also present, complexes may be formed from metallic boron or the boron hydrides.

When the complex is previously prepared and added to the reaction mixture, the reaction of the silane and the boron material may be effected generally at or below reflux temperature at atmospheric pressure. An excess of silane may be employed if desired to act as a solvent for the complex formed, though many of the complexes are liquid products. When $B_2O_3$ is used as the source of boron or when low-boiling silanes such as $SiCl_4$ and $HSiCl_3$ are employed as the source of silicon, higher temperatures than reflux temperature are generally desirable in order to produce a soluble complex in a short reaction time. Accordingly, in such procedures super atmospheric pressure may be employed in order to obtain higher temperatures for liquid phase reaction.

When the complex is formed in situ in the reaction mixture, the silane forming the complex is one of the silanes present in the reaction mixture. The boron employed is preferably a compound of the general formula $(R''_cO)_3B_{2-c}$, where $R''$ is a substituent of the group consisting of monovalent hydrocarbon radicals and hydrogen and $c$ is an integer from 0 to 1. Thus, for example, when benzene and silico-chloroform are being reacted, boric acid may be added to the reaction mixture. The boric acid will interact with the silicochloroform to form a complex which then acts as a catalyst for the interaction of the remaining silicochloroform with the benzene.

Materials such as $H_3BO_3$ and $B_2O_3$ may be used for the in situ formation of the catalyst complexes in either batch-wise or continuous processes. They are more satisfactory, however, in a batch-wise process than in a continuous process, due to the mechanical difficulties involved in using solid materials in most continuous process types of high pressure apparatus. Thus, in a continuous process, it is preferred to employ either a liquid organoborate or a solution of one of the pre-formed silicon-borate complexes as the catalyst.

The silicon-borate complexes have been found in the products of the $BCl_3$ catalyzed reaction of benzene and $HSiCl_3$ when combined oxygen is present in the system as water or siloxane oxygen. If such a system is completely anhydrous and free of combined oxygen, all $BCl_3$ in the system can be recovered as such. However, when there is moisture introduced or any siloxane present in the system, the $BCl_3$ reacts in such a manner that silicon-borate complexes are formed. Under these conditions, metallic boron or the boron hydrides and organoboron halides may also form similar complexes. Such complexes are of both the distillable and non-distillable types, and it has been found that they are excellent catalysts for the process of this invention. They can be recycled in the process indefinitely. In such recycling, any loss of catalyst can be made up by addition of the necessary amount of $BCl_3$ or any of the other boron compounds herein disclosed.

The process of the present invention is operable over a wide range of proportions of polyhalomonohydrosilane and hydrocarbon in the reaction mixture. However, based upon economics and the law of mass action, it is preferable to have less than 20 mols of either of the reactants per mol of the other reactant.

When it is desired to direct the process toward the production of monosilyl derivatives of the benzenoid hydrocarbons, it is preferable to operate with a slight excess of the hydrocarbon. The use of mixtures which contain more than one molecular equivalent of the silane per mol of hydrocarbon results in an increase in the amount of polysilyl derivatives of the hydrocarbon. Thus, with these larger proportions of the silane, substantially increased amounts of bis- and tris-silyl hydrocarbons are obtained without appreciable decrease in the amount of the monosilyl hydrocarbon produced.

In a preferred form of the present invention, the reactants are heated at a reaction temperature above 150° C. At temperatures above 420° C. no advantage over conducting the reaction without catalyst is obtained. When the polyhalomonohydrosilane is trichlorosilane, the preferred reaction temperature is from 230° C. to 300° C. When the polyhalomonohydrosilane is an organohalomonohydrosilane, such as $CH_3HSiCl_2$, the preferred reaction temperature is from 150° C. to 250° C.

The pressure employed should be sufficient to ensure that at the temperature of operation at least a portion of the reaction mixture is in a condensed phase. Thus, when the operation is conducted at a temperature below the critical temperature of the hydrocarbon the pressure should be sufficient to maintain some liquid phase. When the temperature is above the critical temperature of the hydrocarbon, the pressure should be at least the critical pressure thereof whereby a condensed phase is present, though present day knowledge of the nature of this state is incomplete. This may be accomplished in various ways, such as by introducing the reactants continuously into the reaction zone under pressure, or by operating under autogenous pressure in a closed system. The indicated phase condition is obtained when there is employed at least 1.2 gram mols of reactants per liter of reactor volume.

The following examples describe specific embodiments of the invention, but are not to be construed as limiting the scope thereof. The per cent yield of product in these examples is based on the amount of polyhalomonohydrosilane consumed in the reaction, and is calculated from the following equation: per cent yield=mols of product$\times 100$/mols of $R_nHSiCl_{3-n}$ loaded minus mols of $R_nHSiCl_{3-n}$ recovered. Any $R_nHSiCl_{3-n}$ which is neither recovered as such nor converted to product, has entered into the by-production of other halosilanes such as $R_nSiCl_{4-n}$ and the bis- or tris-silyl-hydrocarbons.

Example 1

A mixture of 1402 grams of benzene, 2440 grams trichlorosilane, and 39 grams boric acid was heated at an average temperature of 290° C. for 16 hours in a 14.4 liter bomb. The maximum pressure attained within the bomb during the heating period was 1025 pounds per square inch. Fractional distillation of the product gave 1298 grams phenyltrichlorosilane, a 40.8 per cent yield.

Example 2

A mixture of 1402 grams benzene, 2440 grams trichlorosilane, and 39 grams $B_2O_3$ was heated at an average temperature of 294° C. for 16 hours in a 14.4 liter bomb. The maximum pressure developed within the bomb during the heating period was 1050 pounds per square inch. Fractional distillation of the reaction product gave 977 grams phenyltrichlorosilane, a 37.5 per cent yield.

Example 3

A mixture of 597 grams (5.5 mols) $(CH_3)_3SiCl$ and 93 grams (1.5 mols) $H_3BO_3$ was heated to 57°–78° C. and allowed to reflux for 40 hours. HCl was evolved throughout most of the reflux period. During the last 11 hours of reflux, a constant pot temperature of 78° C. was reached and maintained. Fractionation of the reaction product yielded 260.8 grams of the desired product, $[(CH_3)_3SiO]_3B$, boiling at 47° C. at an absolute pressure of 5 mm. mercury and having a refractive index at 25° C. of 1.3852. A 2.4 liter bomb was loaded with 468 grams benzene, 542 grams $HSiCl_3$, and 25 grams of the $[(CH_3)_3SiO]_3B$ prepared above. The reactants were heated at an average temperature of 275° C. for 7 hours. Fractionation of the reaction product gave 108 grams of $C_6H_5SiCl_3$, a 35.9 pr cent yield.

Example 4

A mixture of 624 grams benzene, 460 grams $CH_3HSiCl_2$, and 27 grams of the $[(CH_3)_3SiO]_3B$ from Example 3 was heated in a 2.4 liter bomb for 7 hours at 200° to 210° C. Fractionation of the reaction product gave unreacted $CH_3HSiCl_2$ and benzene, and 194 grams $C_6H_5CH_3SiCl_2$, a 46 per cent yield.

Example 5

A mixture of 142 grams of $C_6H_5(CH_3)_2SiCl$ and 15.5 grams $H_3BO_3$ was heated for 16 hours at 150–160° C. with vigorous evolution of HCl. The liquid reaction product was held under slightly reduced pressure to remove any remaining dissolved HCl. This resulted in a slightly hazy solution which was analyzed and found to contain 3.45 per cent by weight of boron. A mixture of 47 grams of this solution, 468 grams benzene, and 542 grams of $HSiCl_3$ was heated in a 2.4 liter bomb for 7 hours at about 275° C. Fractionation of the reaction product yielded 295 grams $C_6H_5SiCl_3$, a 45.6 per cent yield.

Example 6

When 50 grams of the silicon-borate solution prepared in Example 5, 552 grams toluene and 460 grams $CH_3HSiCl_2$ are heated in a 2.4 liter bomb for 16 hours at a temperature of 180° C., tolylmethyldichlorosilane is obtained.

Example 7

A mixture of 62 grams $H_3BO_3$ and 345 grams of $CH_3HSiCl_2$ was refluxed for 48 hours, with evolution of HCl. The liquid portion of the reaction product was decanted off, and analysis showed it contained 1.8 per cent by weight of boron. A mixture of 55 grams of this solution, 624 grams benzene, and 460 grams of $CH_3HSiCl_2$ was heated in a 2.4 liter bomb for 7 hours at 200° to 210° C. Fractionation of the reaction product gave 217 grams of $C_6H_5CH_3SiCl_2$, a 35.2 per cent yield.

Example 8

A mixture of $C_6H_5SiCl_3$ and $H_3BO_3$ was refluxed for 16 hours, with evolution of HCl. The liquid portion of the reaction product contained 0.98 per cent boron by weight. A mixture of 96 grams of this liquid, 468 grams benzene, and 542 grams $HSiCl_3$ was heated in a 2.4 liter bomb for 7 hours at about 275° C. Fractionation of the reaction product gave 276 grams of $C_6H_5SiCl_3$, a 46.4 per cent yield.

Example 9

When a mixture of 2776 grams of biphenyl, 2440 grams $HSiCl_3$, and 400 grams of the

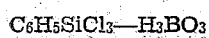
$C_6H_5SiCl_3$—$H_3BO_3$ reaction product from Example 8 are heated in a 14.4 liter bomb for 16 hours at 300° C., two isomeric biphenylyltrichlorosilanes are produced. One is a liquid which distills at from 200°–202° C. at 30 mm. mercury absolute pressure, and the other is a white, crystalline material which distills at from 205°–207° C. at 30 mm.

Example 10

A mixture of 21 grams of tributylborate

$(C_4H_9O)_3B$ 624 grams benzene, and 460 grams $CH_3HSiCl_2$ was heated in a 2.4 liter bomb for 7 hours at 200°–210° C. Fractionation of the reaction product gave 230 grams $C_6H_5CH_3SiCl_2$, at 45.8 per cent yield.

Example 11

A few crystals of $H_3BO_3$ were added to a mixture of 64.5 grams $(CH_3)_2SiCl_2$ and 74 grams $(CH_3)_2Si(OC_2H_5)_2$. An interchange reaction took place immediately, giving the compound

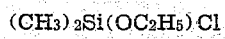
$(CH_3)_2Si(OC_2H_5)Cl$

To this 22 grams of $H_3BO_3$ were added, causing evolution of HCl. The mixture was heated at 75° C. until no solids remained, and then was put under vacuum to remove dissolved HCl. A clear solution was obtained which had an analysis of 3.05 per cent by weight of boron, and which was comprised essentially of the compound

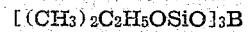
$[(CH_3)_2C_2H_5OSiO]_3B$

A mixture of 33 grams of this solution, 624 grams benzene, and 460 grams $CH_3HSiCl_2$ was heated in a 2.4 liter bomb for 7 hours at 200°–210° C. Fractionation of the reaction product gave 206 grams of $C_6H_5CH_3SiCl_2$, a 42.2 per cent yield.

Example 12

A mixture of benzene and trichlorosilane, in a molar ratio of 1.5 to 1.0, and $BCl_3$ in an amount equal to 0.5 per cent by weight of the reactants, was heated in condensed phase at about 275° C. for 16 hours. The benzene used was known to be contaminated with a small amount of miscellaneous organosiloxanes. The reaction product was fractionated to remove unreacted $HSiCl_3$, benzene, and product $C_6H_5SiCl_3$. When the $C_6H_5SiCl_3$ had been substantially removed, the distillation residue was found to contain 0.46 per cent by weight of boron. This residue is referred to hereinafter as catalyst A. Fractionation of a portion of "catalyst A" was continued to isolate materials boiling above $C_6H_5SiCl_3$. Two boron-rich fractions were obtained. The first (catalyst B) boiled in the range of from 80°–90° C. at an absolute pressure of 15 mm. mercury. It had a specific gravity at 25° C. of 1.261, and was found to contain 1.03 per cent by weight of boron. The second fraction (catalyst C) boiled in the range of from 106°–159° C. at 14 mm. pressure. It had a specific gravity at 25° C. of 1.325, and was found to contain 1.02 per cent by weight of boron.

Three runs were made in the 2.4 liter bomb in each of which the reactants were 468 grams benzene and 542 grams HSiCl₃. A reaction period of 7 hours at an average temperature of 275° C. was allowed for each run. In the first run, 202 grams of "catalyst A" were used. Fractionation of the reaction product gave 247 grams of $C_6H_5SiCl_3$, a 56.1 per cent yield. In the second run, 60 grams of "catalyst B" were used. Fractionation gave 382 grams $C_6H_5SiCl_3$, a 55.9 per cent yield. In the third run, 60 grams of "catalyst C" were used, and 375 grams of $C_6H_5SiCl_3$ were obtained, which was a 54.8 per cent yield.

*Example 13*

A mixture of 468 grams of benzene, 708 grams $C_6H_5HSiCl_2$, and 60 grams of "catalyst B" from Example 12 was heated in a 2.4 liter bomb for 16 hours at 200° C. Fractionation of the reaction product yielded $(C_6H_5)_2SiCl_2$.

*Example 14*

A mixture of 380 grams of naphthalene, 407 grams of trichlorosilane, and 20 grams of the compound $[(CH_3)_3SiO]_3B$ prepared in Example 3 was heated in a 2.4 liter bomb for 16 hours at about 280° C. Fractionation of the reaction product yielded naphthyltrichlorosilane and dihydronaphthyltrichlorosilane.

That which is claimed is:

1. The process which comprises reacting a benzenoid hydrocarbon free of aliphatic unsaturation in any side chains with a polyhalomonohydrosilane of the general formula $R_nHSiCl_{3-n}$, in which R represents a monovalent hydrocarbon radical free of aliphatic unsaturation and $n$ is an integer of from 0 to 1, at a reaction temperature of from 150° C. to 420° C., at least a portion of the reaction mixture being in condensed phase; in the presence of a silicon-borate complex selected from the group consisting of (1) the reaction product of a silane of the general formula $R'_{4-a-b}H_aSiX_b$ where each R' represents a monovalent hydrocarbon radical, each X is selected from the group consisting of alkoxy and chlorine, $a$ is an integer of from 0 to 1, $b$ is an integer of from 1 to 4, and the sum of $a$ and $b$ is not greater than 4; with a compound selected from the group consisting of $B_2O_3$ and compounds of the general formula $(R''O)_xBR_{3-x}$ where R'' is selected from the group consisting of monovalent hydrocarbon radicals and hydrogen, R is as defined above, and $x$ is an integer of from 1 to 3 inclusive; and (2) the reaction product of a silicon compound selected from the group consisting of siloxanes and silanols with a compound of the general formula $R_yBY_{3-y}$ where R is a monovalent hydrocarbon radical free of aliphatic unsaturation, Y is a halogen atom and $y$ is an integer of from 0 to 3 inclusive; whereby to produce an arylchlorosilane.

2. The process of claim 1 in which the polyhalomonohydrosilane is of the general formula $(CH_3)_nHSiCl_{3-n}$ in which $n$ is an integer of from 0 to 1.

3. The process of claim 1 in which the benzenoid hydrocarbon is benzene, the polyhalomonohydrosilane is $CH_3HSiCl_2$, and in which the reaction is conducted at a temperature of from 150° C. to 250° C.

4. The process of claim 1 in which the benzenoid hydrocarbon is benzene, the polyhalomonohydrosilane is $HSiCl_3$, and in which the reaction is conducted at a temperature of from 230° C. to 420° C.

5. The process which comprises reacting a mixture of (1) a benzenoid hydrocarbon free of aliphatic unsaturation in any side chains, (2) a polyhalomonohydrosilane of the general formula $R_nHSiCl_{3-n}$, in which R represents a monovalent hydrocarbon radical free of aliphatic unsaturation and $n$ is an integer of from 0 to 1, and (3) a boron compound of the general formula $(R''_cO)_3B_{2-c}$, where R'' is a substituent of the group consisting of monovalent hydrocarbon radicals and hydrogen and $c$ is an integer of from 0 to 1; at a reaction temperature of from 150° C. to 420° C., at least a portion of the reaction mixture being in condensed phase, whereby to produce an acrylchlorosilane.

6. The process of claim 5 in which the boron compound is present in such an amount that from 0.01 to 0.5 per cent by weight of boron is present, based on the total weight of the reactants.

7. The process which comprises reacting a mixture of benzene, a polyhalomonohydrosilane of the general formula $(CH_3)_nHSiCl_{3-n}$ where $n$ is an integer of from 0 to 1, and a boron compound of the general formula $(R''_cO)_3B_{2-c}$, where R'' is a substituent of the group consisting of monovalent hydrocarbon radicals and hydrogen and $c$ is an integer from 0 to 1; at a reaction temperature of from 150° C. to 420° C., at least a portion of the reaction mixture being in condensed phase, whereby to produce an arylchlorosilane.

8. The process of claim 7 in which the boron compound is present in an amount such that from 0.01 to 0.5 per cent by weight of boron is present, based on the total weight of the reactants.

9. The process which comprises reacting a mixture of benzene, a polyhalomonohydrosilane of the general formula $(CH_3)_nHSiCl_{3-n}$ in which $n$ is an integer of from 0 to 1, and a silicon-borate complex of the general formula $$[(CH_3)_{3-n}(C_2H_5O)_nSiO]_3B$$

in which $n$ is an integer of from 0 to 1; at a reaction temperature of from 150° C. to 420° C., at least a portion of the reaction mixture being in condensed phase, whereby to produce an arylchlorosilane.

10. The process in accordance with claim 9 in which the polyhalomonohydrosilane is $CH_3HSiCl_2$ and in which the reaction is conducted at a temperature of from 150° C. to 250° C.

11. The process in accordance with claim 9 in which the polyhalomonohydrosilane is $HSiCl_3$ and in which the reaction is conducted at a temperature of from 230° C. to 420° C.

ARTHUR J. BARRY.

REFERENCES CITED

The following references are of record in the file of this patent:

UNITED STATES PATENTS

| Number | Name | Date |
| --- | --- | --- |
| 2,510,853 | Barry et al. | June 6, 1950 |
| 2,511,820 | Barry et al. | June 13, 1950 |